(12) United States Patent
Nishitani et al.

(10) Patent No.: US 10,946,456 B2
(45) Date of Patent: Mar. 16, 2021

(54) APPARATUS AND METHOD FOR CUTTING INNER SURFACE OF HOLE

(71) Applicant: IHI Corporation, Koto-ku (JP)

(72) Inventors: Akiyuki Nishitani, Tokyo (JP); Michiko Enda, Tokyo (JP); Yoshiki Irei, Tokyo (JP); Akira Nakanishi, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/512,792

(22) Filed: Jul. 16, 2019

(65) Prior Publication Data

US 2019/0337058 A1     Nov. 7, 2019

Related U.S. Application Data

(63) Continuation of application No. PCT/JP2018/008770, filed on Mar. 7, 2018.

(30) Foreign Application Priority Data

Apr. 10, 2017     (JP) .............................. JP2017-077283

(51) Int. Cl.
  *B23B 41/02*     (2006.01)
  *B23B 35/00*     (2006.01)
  *B23B 47/00*     (2006.01)

(52) U.S. Cl.
  CPC .............. *B23B 35/00* (2013.01); *B23B 41/02* (2013.01); *B23B 47/00* (2013.01)

(58) Field of Classification Search
  CPC ............ B23B 29/027; B23B 2270/025; B23B 2260/116; B23B 29/03446; B23B 41/02; B23B 47/00
  See application file for complete search history.

(56) References Cited

U.S. PATENT DOCUMENTS

| 2,257,609 A | 9/1941 | Kollath |
| 5,062,187 A * | 11/1991 | Bromley ................ B23B 29/02 29/33 T |
| 2011/0079120 A1 | 4/2011 | Nishitani et al. |

FOREIGN PATENT DOCUMENTS

| EP | 2 251 124 A1 | 11/2010 |
| GB | 2 028 962 A | 3/1980 |

(Continued)

OTHER PUBLICATIONS

Extended European Search Report dated Jul. 29, 2020 in corresponding European Patent Application No. 18784421.2 citing documents AA, AO, AP therein, 5 pages.

(Continued)

*Primary Examiner* — Alan Snyder
(74) *Attorney, Agent, or Firm* — Oblon, McClelland, Maier & Neustadt, L.L.P.

(57) ABSTRACT

A hole inner-surface cutting apparatus includes a working head composed of a rotatable body having a cutting tool and a main body, a rotation rod for rotating the rotatable body, and a stroke rod for stroking the working head. At least three positioning mechanisms for positioning the working head along a radial direction in the penetrating hole is provided on the main body. Each of the positioning mechanisms has three sliders arranged radially, guide rollers respectively disposed on distal ends of the sliders, a piston for pressing the sliders radially outward, and a fluid pressure chamber for actuating the piston. Further provided is a controller for controlling fluid pressures in the fluid pressure chambers of the positioning mechanisms independently from each other.

5 Claims, 12 Drawing Sheets

(56) References Cited

FOREIGN PATENT DOCUMENTS

| | | |
|---|---|---|
| JP | 63-74017 | 4/1988 |
| JP | 64-38639 | 2/1989 |
| JP | 6-9814 | 2/1994 |
| JP | 2000-246593 | 9/2000 |
| JP | 2009-241249 | 10/2009 |
| JP | 2010-188484 | 9/2010 |
| JP | 2013-805 | 1/2013 |
| JP | 2013-7224 | 1/2013 |
| JP | 2016-163913 | 9/2016 |

OTHER PUBLICATIONS

International Search Report dated May 29, 2018 in PCT/JP2018/008770 filed on Mar. 7, 2018.
Written Opinion dated May 29, 2018 in PCT/JP2018/008770 filed on Mar. 7, 2018.

* cited by examiner

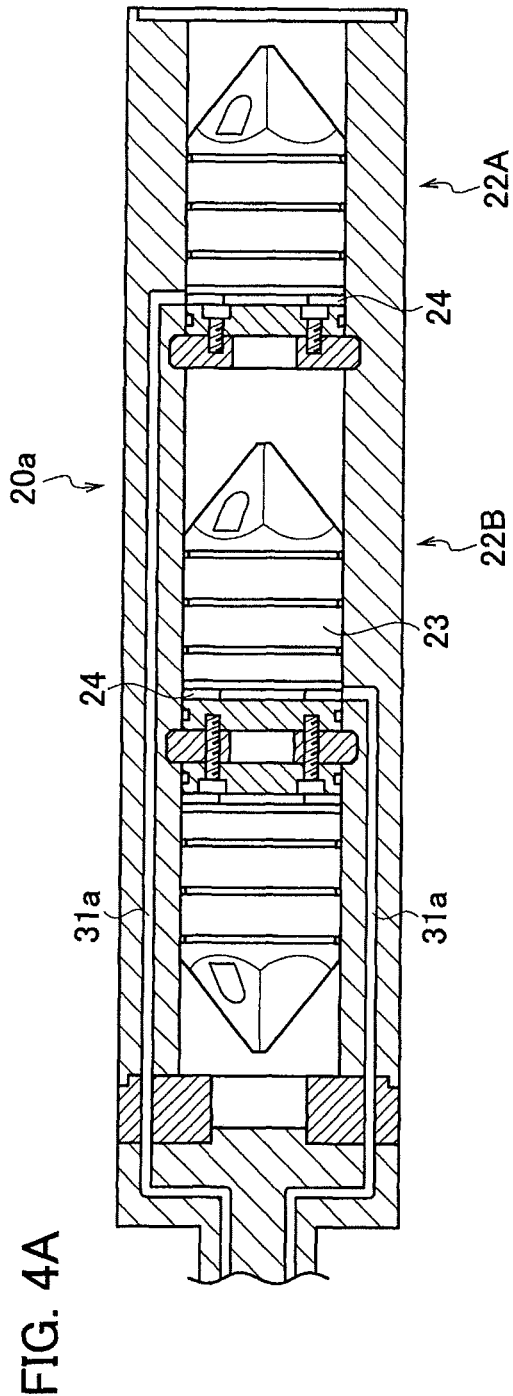
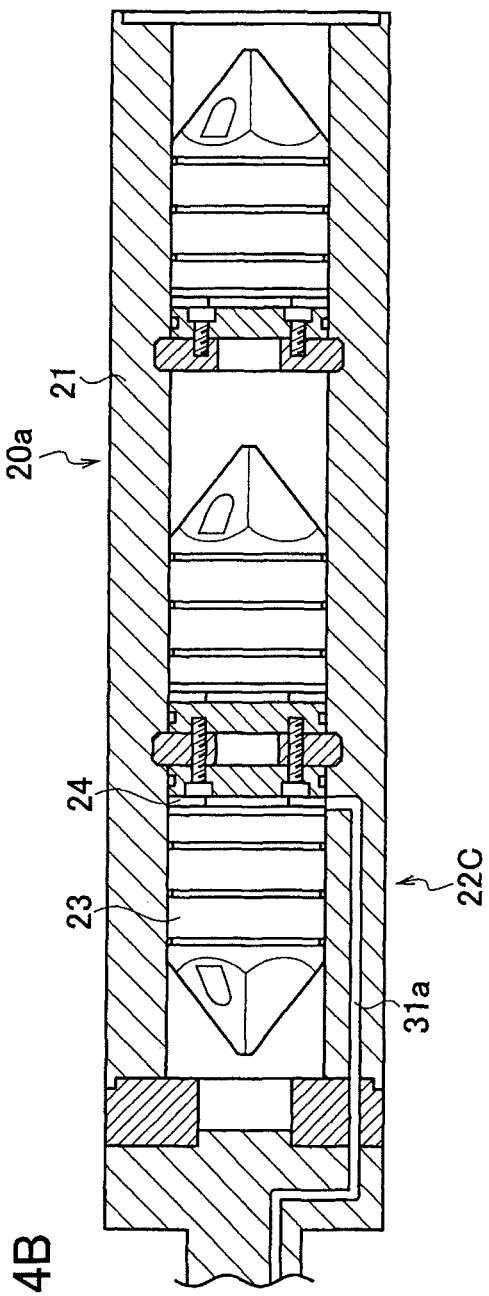

APPARATUS AND METHOD FOR CUTTING INNER SURFACE OF HOLE

CROSS-REFERENCE TO RELATED APPLICATIONS

The present application is a Continuation Application of PCT International Application No. PCT/JP2018/008770 (filed on Mar. 7, 2018), which is based upon and claims the benefit of priority from Japanese Patent Application No. 2017-77283 (filed on Apr. 10, 2017), the entire contents of which are incorporated herein by reference.

BACKGROUND

Technical Field

This disclosure relates to an apparatus and a method for cutting an inner surface of a penetrating hole formed in a workpiece.

Background Art

A Patent Document 1 (Japanese Patent Application Laid-open No. 2010-188484) discloses an apparatus for cutting an inner surface of a penetrating hole formed in a long hollow shaft. In the apparatus, a working head having a rotatable cutting insert is travelled in an axial direction of the penetrating hole. On this occasion, three rollers radially protruded from the working head are pressed onto the inner surface of the penetrating hole, and thereby a position of the working head in the penetrating hole is kept. A set of the three rollers is disposed at two positions, leading and trailing positions, of the working head, and thereby a center axis of the working head is made coincident with the axial direction of the penetrating hole.

SUMMARY

According to the apparatus disclosed in the Patent Document 1, the inner surface of the penetrating hole can be cut in a case where an inner diameter of the penetrating hole changes gently. However, in a case where an inner diameter of the penetrating hole reduces or expands locally (i.e. in a case where a circumferential protrusion or a circumferential groove is formed on the inner surface), friction in the axial direction increases when the rollers pass over the circumferential protrusion or the circumferential groove and thereby they cannot move in the axial direction.

An object of this disclosure is to provide an apparatus and a method for cutting an inner surface of a hole that can cut the inner surface of the penetrating hole with high precision even if an inner diameter of the penetrating hole formed on a workpiece reduces or expands locally.

A first aspect of this disclosure provides a hole inner-surface cutting apparatus for cutting an inner surface of a penetrating hole formed in a workpiece, the apparatus comprising: a workpiece hold device that holds the workpiece; a working head capable of being inserted into the penetrating hole, and including a head rotatable body that has a cutting tool for cutting the inner surface of the penetrating hole and is rotatable about a center axis thereof and a head main body that rotatably holds the head rotatable body; a head rotation rod capable of being inserted into the penetrating hole from an end of the penetrating hole, and coupled with the head rotatable body to rotate the head rotatable body by being rotated by a rotation drive source; and a head stroke rod capable of being inserted into the penetrating hole from another end of the penetrating hole, and coupled with the head main body to stroke the working head in an axial direction of the penetrating hole by being stroked by a stroke drive source, wherein a cutting tool shift mechanism for shifting the cutting tool in a radial direction perpendicular to the axial direction is provided in the head rotatable body of the working head and the head rotation rod, a plurality of positioning mechanisms for positioning the working head along the radial direction in the penetrating hole is provided at at least three positions along the axial direction in the head main body, each of the positioning mechanisms has at least three sliders radially arranged evenly and slidable in the radial direction, guide rollers respectively disposed on distal ends of the sliders and contacting with the inner surface of the penetrating hole, a piston for pressing the sliders outward in the radial direction, and a fluid pressure chamber for actuating the piston, and the hole inner-surface cutting apparatus further comprises a controller configured to control fluid pressures in the fluid pressure chambers of the positioning mechanisms independently from each other.

A second aspect of this disclosure provides a hole inner-surface cutting method for cutting an inner surface of a penetrating hole formed in a workpiece by using the hole inner-surface cutting apparatus according to the above first aspect, the method comprising: when one of the positioning mechanism gets close to a local diameter-reduction portion in which the inner diameter of the penetrating hole locally reduces, making a pressure in the fluid pressure chamber of the positioning mechanism associating with the local diameter-reduction portion lower than pressures in the fluid pressure chambers of the other positioning mechanisms.

According to the first or second aspect, the position of the cutting tool can be kept with high precision by the positioning mechanisms provided at the at least three positions in the head main body. Even if there is a portion where the inner diameter of the penetrating hole locally reduces or expands, when any one of the plural position mechanisms passes over such a portion, the center axis of the working head is made coincident with the axial direction of the penetrating hole by the remaining others of the plural positioning mechanisms. Therefore, the inner surface of the penetrating hole formed in the workpiece can be cut with high precision.

BRIEF DESCRIPTION OF DRAWINGS

FIGS. 4A and 4B are cross-sectional views showing fluid pressure passages in the working head;

DESCRIPTION OF EMBODIMENTS

Figure 1:
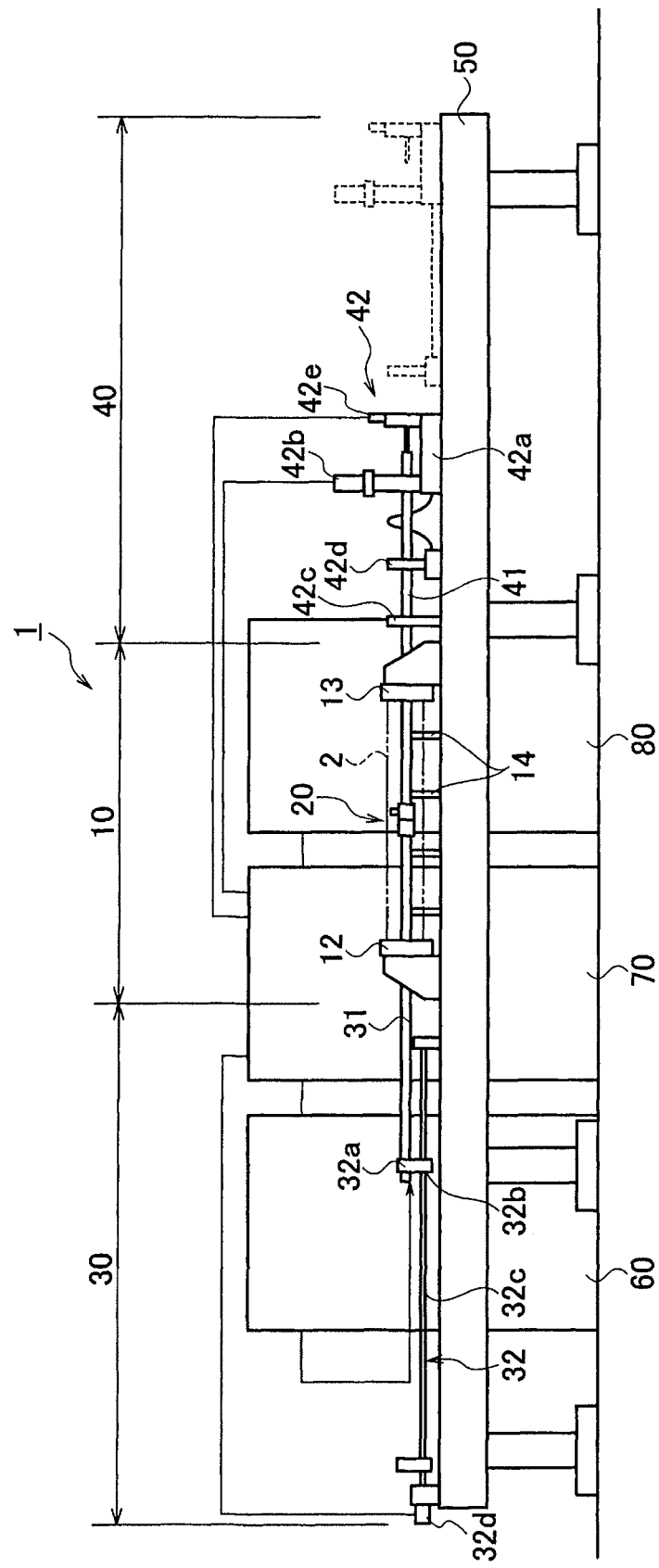
FIG. 1 is a schematic side view showing an overall configuration of a hole inner-surface cutting apparatus according to an embodiment.

A hole inner-surface cutting apparatus (a hole inner-surface cutting method) according to an embodiment will be explained. First, overall configuration of the hole inner-surface cutting apparatus 1 is explained. As shown in FIG. 1, the hole inner-surface cutting apparatus 1 includes a workpiece hold device 10 located at its center, a head stroke device 30 located on one side (on a left side in FIG. 1) of the workpiece hold device 10, and a head rotation device 40 located on the other side (on a right side in FIG. 1) of the workpiece hold device 10. The workpiece hold device 10, the head stroke device 30 and the head rotation device 40 are arranged so as to be aligned in line on a table 50. Note that the workpiece hold device 10, the head stroke device 30 and the head rotation device 40 may be disposed so as to be aligned vertically on a wall surface.

Figure 2:
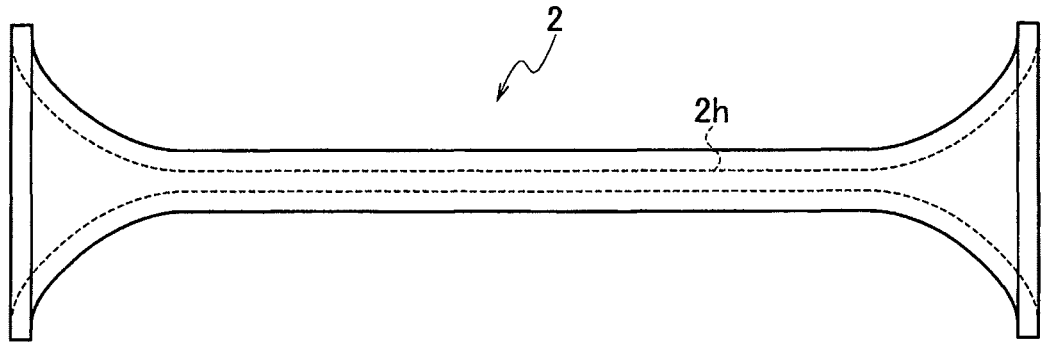
FIG. 2 is a schematic side view of a long hollow shaft as a workpiece to be worked by the hole inner-surface cutting apparatus.

A workpiece 2 in the present embodiment is a long hollow shaft as shown in FIG. 2, for example. The hollow shaft 2 has an about three meter length, and each diameter at its both ends is expanded. In the hollow shaft 2, a penetrating hole 2h are formed along its axial direction. Each inner diameter at both ends of the penetrating hole 2h is also expanded. An inner diameter at the center of the penetrating hole 2h is almost 90 mm. A circumferential protrusion 2r or a circumferential groove 2g that will be explained later is formed on an inner surface of the penetrating hole 2h, but not shown in FIG. 2. Note that the workpiece in the present embodiment is the hollow shaft 2, but it is not limited to the hollow shaft as shown in FIG. 2 as long as a penetrating hole is formed therein. The hollow shaft 2 is shown schematically in FIG. 1 by dot-and-dash lines.

The workpiece hold device 10 holds the hollow shaft 2 while cutting the inner surface of the penetrating hole 2h of the hollow shaft (workpiece) 2. The hollow shaft 2 is held so that its axial direction coincides with a travel direction of an after-explained working head 20. The workpiece hold device 10 has a pair of chucks 12 and 13 for holding both ends of the hollow shaft 2. Specifically, each the chucks 12 and 13 disposed oppositely to each other is a scroll chuck with three or more jaws. Plural holders 14 for supporting the hollow shaft 2 from beneath or clamping the hollow shaft 2 are also provided between the paired chucks 12 and 13. The hollow shaft 2 is held by the chucks 12 and 13 and the holders 14 so that the axial direction of the penetrating hole 2h coincides with the travel direction of the working head 20 (so that the hollow shaft 2 never curves). Note that, in a case where the workpiece 2 is not a hollow shaft, the workpiece hold device 10 hold the workpiece 2 so that an axial direction of a penetrating hole (2h) formed in a workpiece 2 coincides with the travel direction of the working head 20.

The working head 20 for cutting the inner surface of the penetrating hole 2h of the hollow shaft 2 is coupled with an after-explained rotation rod 41 at its one end (a head rotatable body 20b), and inserted into the penetrating hole 2h from one end of the penetrating hole 2h of the hollow shaft 2 held by the workpiece hold device 10. Then, a stroke rod 31 is coupled with the other end (a head main body 20a) of the working head 20 on a side of the other end of the penetrating hole 2h. Alternatively, the working head 20 is inserted into the penetrating hole 2h after being coupled with the head stroke rod 31, and further coupled with the head rotation rod 41. The working head 20 will be explained later in detail.

The head stroke device 30 includes the head stroke rod 31 and a rod stroke mechanism 32. A distal end (a right end in FIG. 1) of the head stroke rod 31 is coupled (fixed) with the working head 20 (the head main body 20a). Three fluid pressure passages 31a (see FIG. 4) for supplying oil pressure to the working head 20 are provided in the head stroke rod 31. The fluid pressure passages 31a are connected with an after-explained oil pressure unit 60. The fluid pressure passages 31a will be explained later together with the oil pressure unit 60 and the working head 20.

The head stroke mechanism 32 strokes the working head 20 coupled with the distal end of the head stroke rod 31 by stroking the head stroke rod 31. The head stroke mechanism 32 includes a block 32a fixed with a base end of the head stroke rod 31, a feed screw 32c screwed with a feed hole 32b formed in the block 32a, and a stroke drive source (feed motor) 32d for rotating the feed screw 32c. The feed screw 32c is disposed in parallel to the head stroke rod 31. The feed screw 32c strokes, by being rotated by the feed motor 32d, the head stroke rod 31 and the working head 20 in a center axial direction of the working head 20 (i.e. in the axial direction of the penetrating hole 2h of the hollow shaft 2 held by the workpiece hold device 10) by the intermediary of the block 32a (the feed hole 32b). The feed motor 32d is connected with an after-explained controller (control console) 70 and controlled by the controller 70.

Note that structure of the head stroke mechanism 32 is not limited to the above-explained structure as long as it can stroke the head stroke rod 31 and the working head 20 with high precision. For example, ball screw mechanism, rack and pinion mechanism, belt/chain mechanism, a liner actuator and so on can be adopted.

The head rotation device 40 includes the head rotation rod 41 and a rod rotation mechanism 42. A distal end (a left end in FIG. 1) of the head rotation rod 41 is coupled (fixed) with (the head rotatable body 20b of) the working head 20. A slide shaft 41a for shifting a cutting tool 20 of the working head 20 in a direction perpendicular to the center axial direction of the working head 20 (in a direction perpendicular to the axial direction of the penetrating hole 2h, i.e. a radial direction of the penetrating hole 2h) is accommodated slidably in the head rotation rod 41. A coolant supply passage 41b (a supply passage of cutting fluid: see FIG. 3) for supplying the cutting fluid (coolant) to the working head 20 is also provided in the head rotation rod 41. The coolant supply passage 41b is connected with an after-explained coolant unit 80. The coolant supply passage 41b will be explained later together with the coolant unit 80 and the working head 20.

The rod rotation mechanism 42 rotates, by rotating the head rotation rod 41, the head rotatable body 20b of the working head 20 coupled with the distal end of the head rotation rod 41. The rod rotation mechanism 42 includes a slide base 42a slidable on the table 50 and a rotation drive source 42b that is provided on the slide base 42a and rotates the head rotation rod 41. When the working head 20 is stroked by the above-explained head stroke device 30, the slide base 42a slides along with the stroke of the working head 20. The rotation drive source 42b holds the head rotation rod 41 rotatably, and rotates the head rotation rod 41 by its rotation motor via a gear mechanism. The rotation drive source 42b is connected with the after-explained controller (control console) 70 and controlled by the controller 70.

The rod rotation mechanism 42 also includes a stationary holder 42c and a movable holder 42d that support the head rotation rod 41 rotatably. The stationary holder 42c is fixed on the table 50. The movable holder 42d is slidable between the slide base 42a and the stationary holder 42c. The movable holder 42d is tethered with the slide base 42a by a wire, a chain or the like. An actuator 42e for sliding the above-explained slide shaft 41a is also provided on the slide base 42a. Shifting of the cutting tool 20c of the working head 20 by the actuator 42e will be explained later. Also the actuator 42e is connected with the controller (control console) 70 and controlled by the controller 70.

Figure 3:
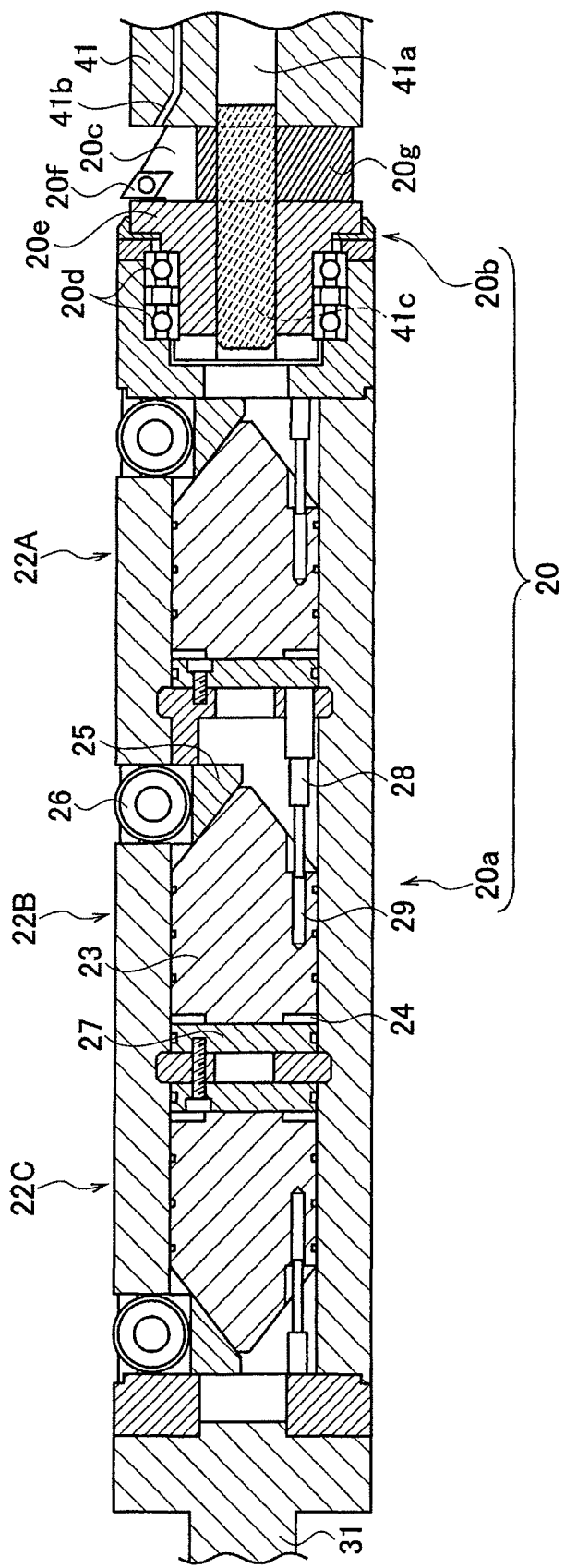
FIG. 3 is a cross-sectional view showing a working head of the hole inner-surface cutting apparatus.

Next, the working head 20 will be explained. As shown in FIG. 3, the working head 20 is comprised of the head main body 20a that doesn't rotate and the head rotatable body 20b that is rotatable. The head main body 20a and the head rotatable body 20b are coupled with each other by the intermediary of bearings 20d. As explained above, the head main body 20a is coupled with the distal end of the head stroke rod 31, and the head rotatable body 20b is coupled with the distal end of the head rotation rod 41.

The head main body 20a has a hollow cylindrical case 21. And, three positioning mechanisms 22A to 22C are provided in the case 21 along the center axial direction of the working head 20. The positioning mechanisms 22A to 22C position the working head 20 in the penetrating hole 2h so that the center axis of the working head 20 coincides with the axis of the penetrating hole 2h. The three positioning mechanisms 22A to 22C will be called as a first mechanism 22A, a second mechanism 222 and a third mechanism 22C sequentially from the after-explained cutting tool 20c of the head rotatable body 20b.

Orientations of the positioning mechanisms 22A to 22C is not all the same, but they have identical configuration. In following explanations, the positioning mechanisms 22A to 22C are collectively called as a positioning mechanism 22, and each configuration of them will be explained hereinafter. The positioning mechanism 22 has a piston 23, the fluid pressure chamber 24, three sliders 25, and freely-rotatable guide rollers 26. The piston 23 is slidable in the center axial direction of the working head 20. The fluid pressure chamber 24 is formed on a base-end side of the piston 23. Each of the sliders 25 can be slid in the radial direction of the working head 20 by the piston 23. Each of the guide rollers 26 is provided on the slider 25 and pressed onto the inner surface of the penetrating hole 2h. A base end portion of the piston 23 has a solid cylindrical shape and a distal end portion thereof has a conical shape. Although a base end of the piston 23 contacts with a bulkhead 27 provided in an inside of the case 21 in FIG. 3, a step is formed along a circumferential edge of the base end of the piston 23 and thereby the fluid chamber 24 is formed by this step so as to be surrounded by an inner circumferential surface of the case 21, the bulkhead 27 and the piston 23.

As shown in FIG. 4A and FIG. 4B, the above-explained fluid pressure passages 31a provided in the head stroke rod 31 are extended into the case 21 of the head main body 20a. When the head stroke rod 31 and the head main body 20a are coupled with each other, the three fluid pressure passages 31a are communicated with the three fluid pressure chambers 24, respectively. The fluid pressure passages 31a formed in the case 21 shown in FIG. 4A and FIG. 4B are not needed to be arranged evenly when viewing along the center axial direction of the working head 20. As long as the fluid pressure passages 31a connect the fluid pressure passages 31a in the head stroke rod 31 with the three fluid pressure chambers 24, respectively, their paths may be formed in various forms. However, paths with as little pressure loss as possible are designed.

Although the three sliders 25 are provided in the single positioning mechanism 22, the three sliders 25 are radially arranged evenly (i.e. every central angle 120°) when viewing along the center axial direction of the working head 20 (only one of the sliders 25 can been seen in FIG. 3). An inner end of the slider 25 has an inclination associating with a slope of the conical portion of the piston 23. Therefore, the three sliders 25 are pushed outward evenly in the radial directions when the piston 23 is slid (actuated) toward a side of the sliders 25 by the fluid pressure in the fluid pressure chamber 24. As the result, the guide rollers 26 attached to outer ends of the sliders 25, respectively, are evenly pressed onto the inner surface of the penetrating hole 2h. When the three guide rollers 26 are evenly pressed onto the inner surface of the penetrating hole 2h, the center axis of the working head 20 is made coincident with the axis of the penetrating hole 2h.

Note that a guide pin 28 is protruded oppositely to the piston 23 and the guide pin 28 is inserted into a guide hole 29 formed in the piston 23. The guide pin 28 and the guide hole 29 are parallel to the center axis of the working head 20, and guide sliding of the piston 23. The piston 23 is restricted from inclining by the guide pin 28 and the guide hole 29, and thereby the piston 23 can slide smoothly.

In the present embodiment, the sliders 25 of the first mechanism 22A, the fluid pressure chamber 24 of the first mechanism 22A, the sliders 25 of the second mechanism 22B, the fluid pressure chamber 24 of the second mechanism 22B, the fluid pressure chamber 24 of the third mechanism 22C, and the sliders 25 of the third mechanism 22C are disposed in this order from the cutting tool 20c along the center axis of the working head 20. Note that the piston 23 is inevitably disposed between the fluid pressure chamber 24 and the slider 25. In other words, the sliders 25 (the guide rollers 26) are disposed on a side of the cutting tool 20c in the first mechanism 22A and the second mechanism 22B that are closer to the cutting tool 20c, and the fluid pressure chamber 24 is disposed on a side of the cutting tool 20c in the third mechanism 22C that is farthest from the cutting tool 20c. This arrangement will be explained later in detail.

Since the three positioning mechanisms 22 (22A to 22C) for making the center axis of the working head 20 coincident with the axis of the penetrating hole 2h are provided along the center axis as explained above, the head main body 20a, i.e. the working head 20, can be positioned with high precision without inclination in the penetrating hole 2h. The after-explained cutting tool 20c on the head rotatable body 20b can be also positioned with high precision due to the high precision positioning of the working head 20, and thereby cutting can be done with high precision.

As shown in FIG. 3, the head rotatable body 20b coupled with the head main body 20a by the intermediary of the bearings 20d has a rotation body 20e that is rotatable and the cutting tool 20c accommodated in the rotation body 20e. The cutting tool 20c is slidable in the above-explained radial direction, and the cutting insert 20f is fixed onto its distal end. Plural inclined mating grooves 20g are formed on a flat side face of a base end portion of the cutting tool 20c.

Plural inclined mated grooves 41c are also formed on the distal end of the above-explained slide shaft 41a provided within the head rotation rod 41. The mating grooves 20g and the mated grooves 41c are slidably mated mutually. Therefore, when the slide shaft 41a slides, the cutting tool 20c is shifted in the radial direction due to mating between the mating grooves 20g and the mated grooves 41c. Namely, the mating grooves 20g, the mated grooves 41c, the slide shaft 41a and the actuator 42e configures a cutting tool shift mechanism that can shift the cutting tool 20c in the radial direction. By shifting the cutting tool 20c in the radial direction, the position of the cutting insert 20f can be adjusted and a cutting diameter can be adjusted. This adjustment of the cutting diameter can be done while the head rotatable body 20b rotates. Namely, the cutting diameter can be adjusted while the inner surface of the penetrating hole 2h is cut.

In FIG. 3, the cutting tool 20c is retracted into the rotation body 20e. The working head 20 is inserted into the penetrating hole 2h in this state, so that the cutting insert 20f can be protected. When the inner surface of the penetrating hole 2h is to be cut, the cutting tool 20c is protruded in the radial direction from the state shown in FIG. 3 (see FIG. 6 to FIG. 11).

Note that, with respect to the slide shaft 41a, only its distal end portion on which the mated grooves 41c are formed rotates together with the head rotation rod 41 and its base end portion from the distal end portion doesn't rotate, and the distal end portion and the base end portion are coupled with each other by the intermediary of a rotary joint. Namely, the base end portion of the slide shaft 41a is slid without rotating within the rotating hollow head rotation rod 41.

In addition, three positioning mechanisms 22 (22A to 22C) are provided in the present embodiment, but four or more may be provided as long as at least three are provided. Further, the three sliders 25 (the three guide rollers 26) are provided in the present embodiment in each of the positioning mechanisms 22, but four or more may be provided as long as at least three are provided. However, in order to make its mechanism as simple as possible and to make the center axis of the working head 20 coincide with the axis of the penetrating hole 2h, it is most preferable to provide the three sliders 25 (the three guide rollers 26) in each of the positioning mechanisms 22.

Furthermore, the inner surface of the penetrating hole 2h of the hollow shaft 2 is cut by the cutting tool 2c while the head stroke rod 31 is pulled (leftward in FIG. 1 and FIG. 3). By preparing a cutting tool 20c that has different orientation, the inner surface of the penetrating hole 2h of the hollow shaft 2 may be cut by the cutting tool 20c while the head stroke rod 31 is pushed (rightward in FIG. 1 and FIG. 3).

Figure 5:
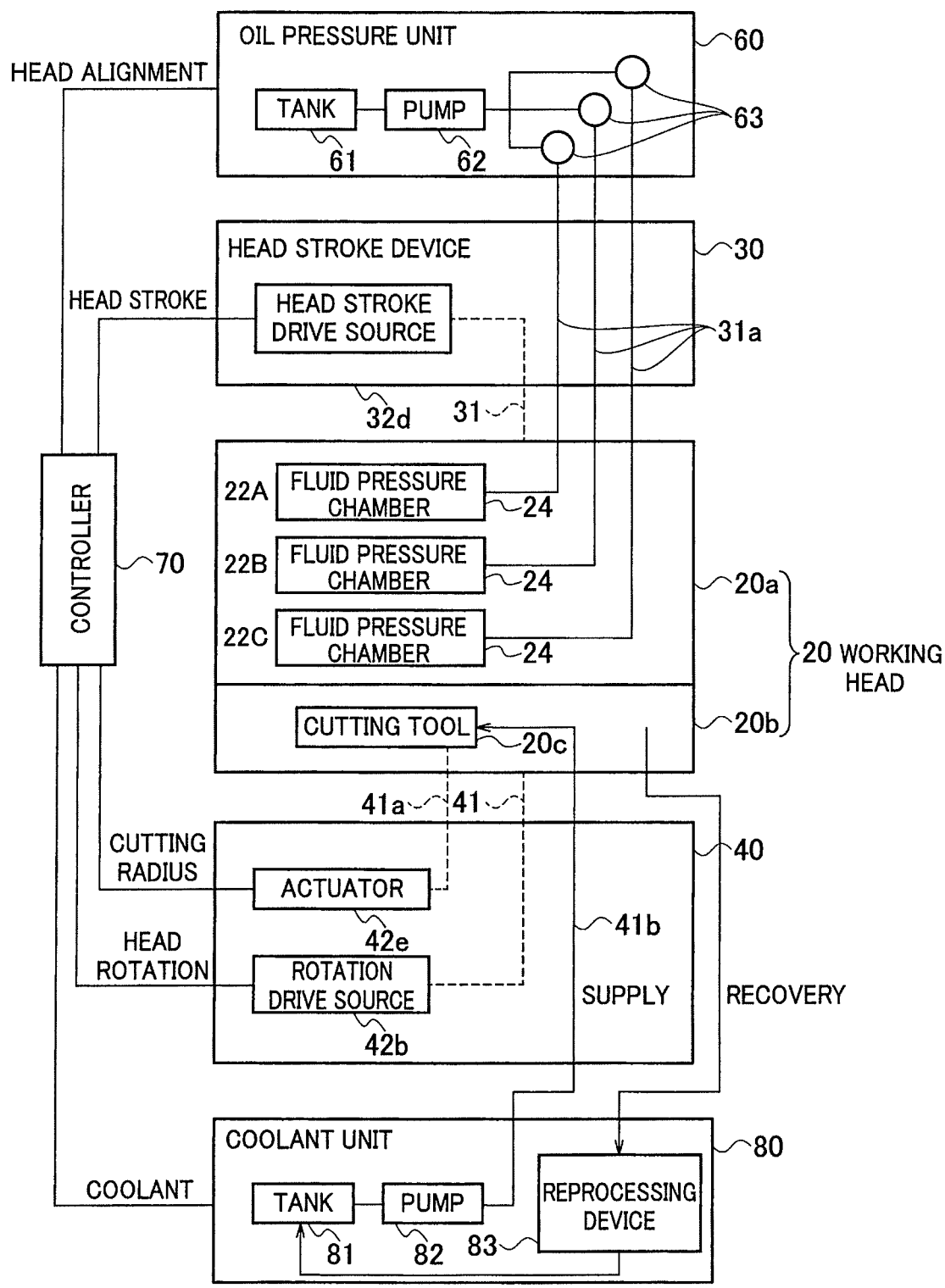
FIG. 5 is a brook diagram showing configuration of the hole inner-surface cutting apparatus.

Subsequently, system configuration of the hole inner-surface cutting apparatus 1 including the oil pressure unit 60, the controller 70, the coolant unit 80 and so on that have been mentioned above will be explained with reference to a block diagram shown in FIG. 5. As shown in FIG. 5, the controller 70 is connected also with the oil pressure unit 60 and controls the oil pressure unit 60. The oil pressure unit 60 has an oil tank 61 and an oil pump 62 that generate fluid pressure to be supplied to the fluid pressure chambers 24 of the positioning mechanisms 22. Note that oil whose fluid pressure has been increased by the oil pump 62 may be accumulated in the oil tank 61 and then supplied to the fluid pressure chambers 24. The oil tank 61 and the oil pump 62 configures a fluid pressure source that supplies the fluid pressure to the fluid pressure chambers 24.

The above-explained fluid pressure passages 31a are branched from the single fluid pressure source. Valve mechanisms 63 for adjusting fluid pressures to be supplied to the pressure chambers 24 are provided on the fluid pressure passages 31a branched in three, respectively. Therefore, the fluid pressures of the three fluid pressure chambers 24 can be adjusted independently from each other by the valve mechanisms 63. The valve mechanisms 63 in the present embodiment are pressure reduction valves. The valve mechanisms 63 are controlled by the controller 70, and thereby the fluid pressure in the desired fluid pressure chamber 24 is reduced. When the fluid pressure in the fluid pressure chamber 24 is reduced, a volumetric capacity of the fluid pressure chamber 24 reduces and thereby the sliders 25 (the guide rollers 26) are retracted into the case 21.

The controller 70 is connected also with the coolant unit 80 and controls the coolant unit 80. The coolant unit 80 has a coolant tank 81 and a coolant pump 82 for injecting coolant to the vicinity of the cutting tool 20c. Note that the coolant injected to the vicinity of the cutting tool 20c restricts frictions during cutting and cools heats generated by cutting. The coolant is recovered and then returned to the coolant tank 81 again after cutting scraps are removed by a reprocessing device 83.

As explained above, the controller 70 is connected also with the stroke drive source (the feed motor) 32d of the head stroke device 30 and controls the stroke of the working head 20. On this occasion, the stroke position of the working head 20 is recognized by the controller 70 based on the number of rotations of the feed motor 32d (control information of the stroke drive source). Note that the stroke position of the working head 20 may be recognized not based on the number of rotations of the feed motor 32d, but based on the number of rotations of the feed screw 32c or the number of rotations of a gear if a gear mechanism is intervenient. Note that an initial position of the stroke position of the working head 20 is set after the workpiece 2 is held on the workpiece hold device 10 but before cutting is started.

In addition, the controller 70 is connected also with the rotation drive source 42b of the head rotation device 40 and controls a rotational position of the head rotatable body 20b, i.e. the cutting tool 20c, of the working head 20. On this occasion, the rotational position of the cutting tool 20c is recognized by the controller 70 based on a state of the rotation drive source 42b. Note that the rotational position of the cutting tool 20c may be recognized not based on the state of the very rotation drive source 42b, but based on the number of rotations of a gear if a gear mechanism is intervenient. Note that an initial position of the rotational position of the working head 20 is set after the workpiece 2 is held on the workpiece hold device 10 but before cutting is started.

In addition, the controller 70 is connected also with the actuator 42e of the head rotation device 40 and controls the cutting diameter of the cutting tool 20c. On this occasion, the cutting diameter (the position in the radial direction) of the cutting tool 20c is recognized by the controller 70 based on a controlling state of the actuator 42e (control information of the cutting tool shift mechanism). Note that cutting diameter of the cutting tool 20c may be recognized not based on the state of the actuator 42e, but by providing a detector for detecting the slide position of the slide shaft 41a. Note that the cutting diameter of the cutting tool 20c is initially set (a position of the tip end of the cutting insert 20f is set) after the workpiece 2 is held on the workpiece hold device 10 but before cutting is started.

Figure 6:
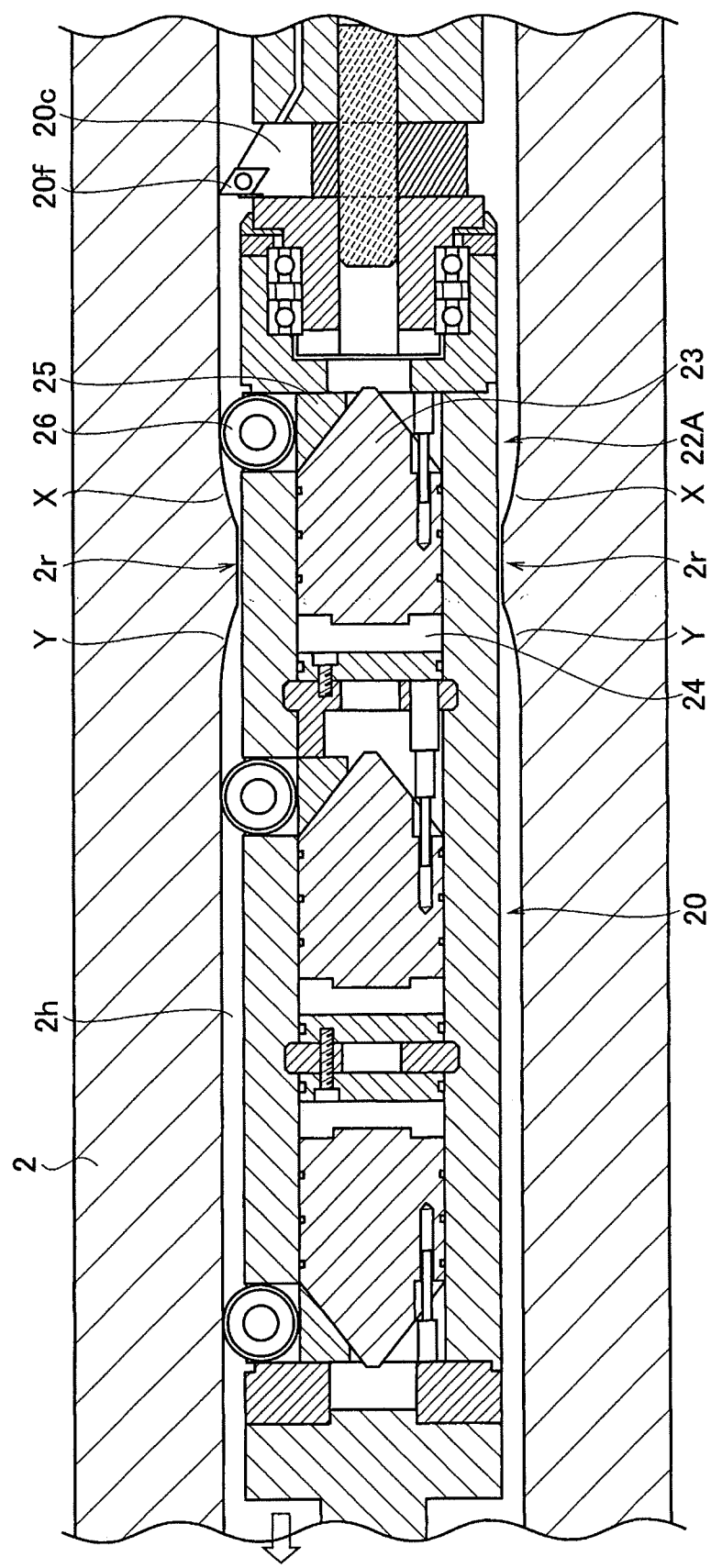
FIG. 6 is a cross-sectional view while the working head passes over a circumferential protrusion on the inner surface of the workpiece (before passing over)
Figure 7:
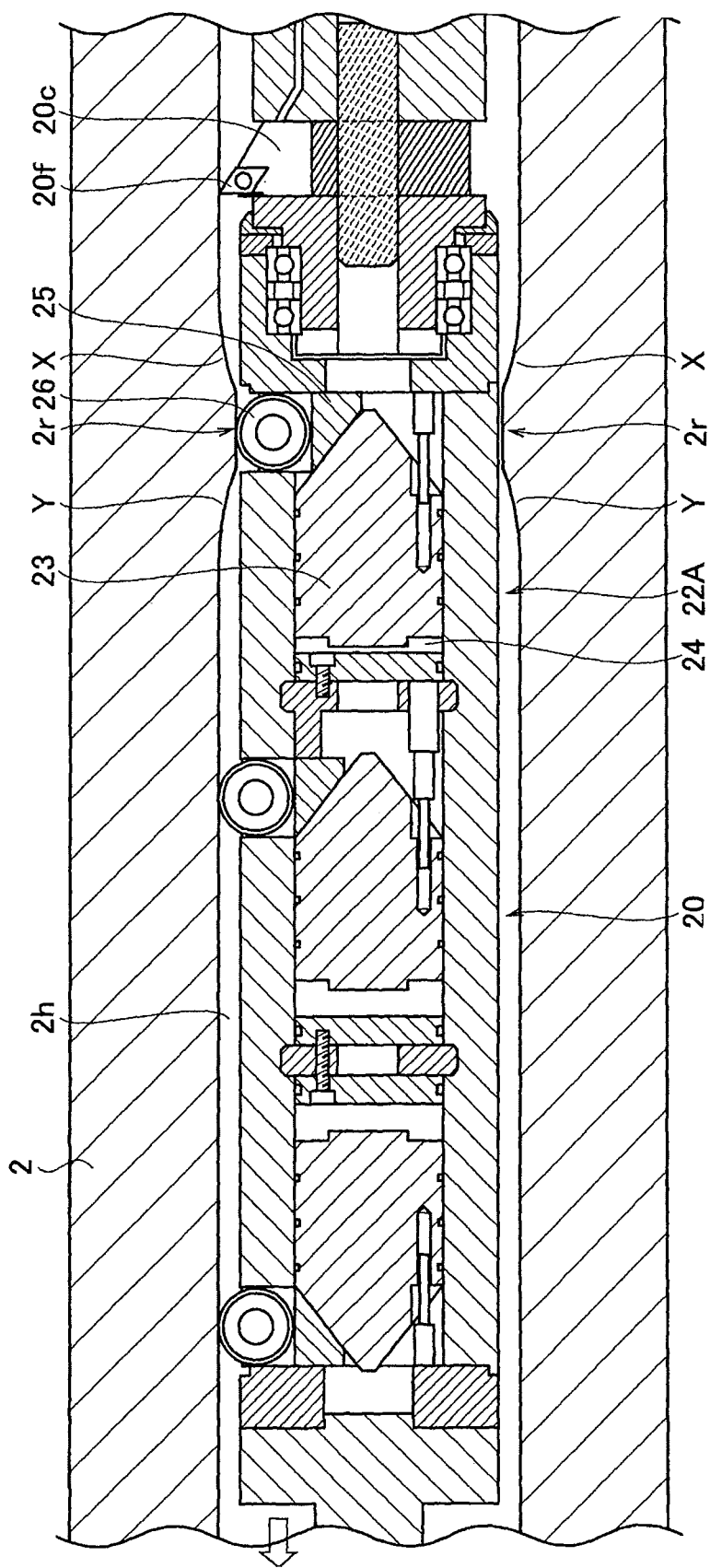
FIG. 7 is a cross-sectional view while the working head passes over the circumferential protrusion on the inner surface of the workpiece (during passing over)
Figure 8:
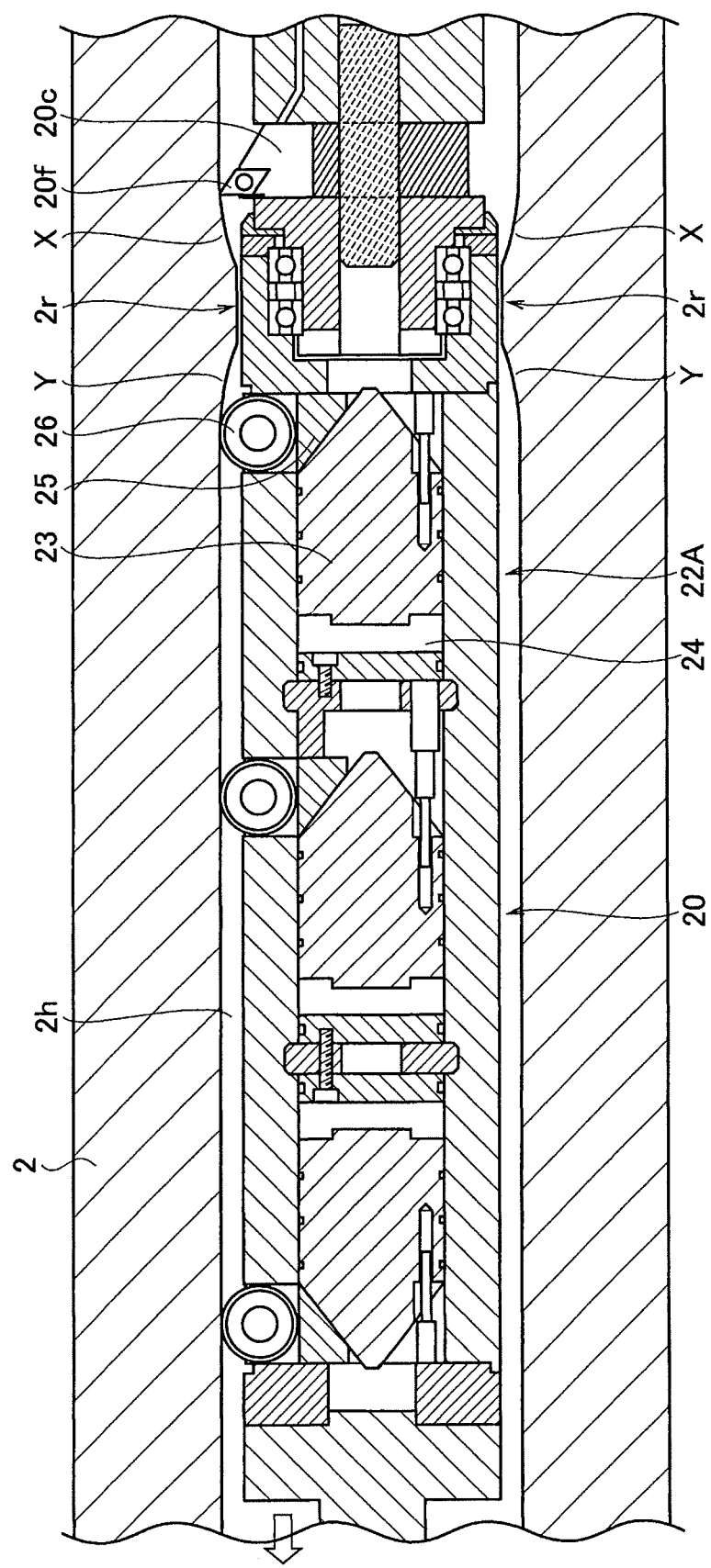
FIG. 8 is a cross-sectional view while the working head passes over the circumferential protrusion on the inner surface of the workpiece (after passing over)
Figure 12:
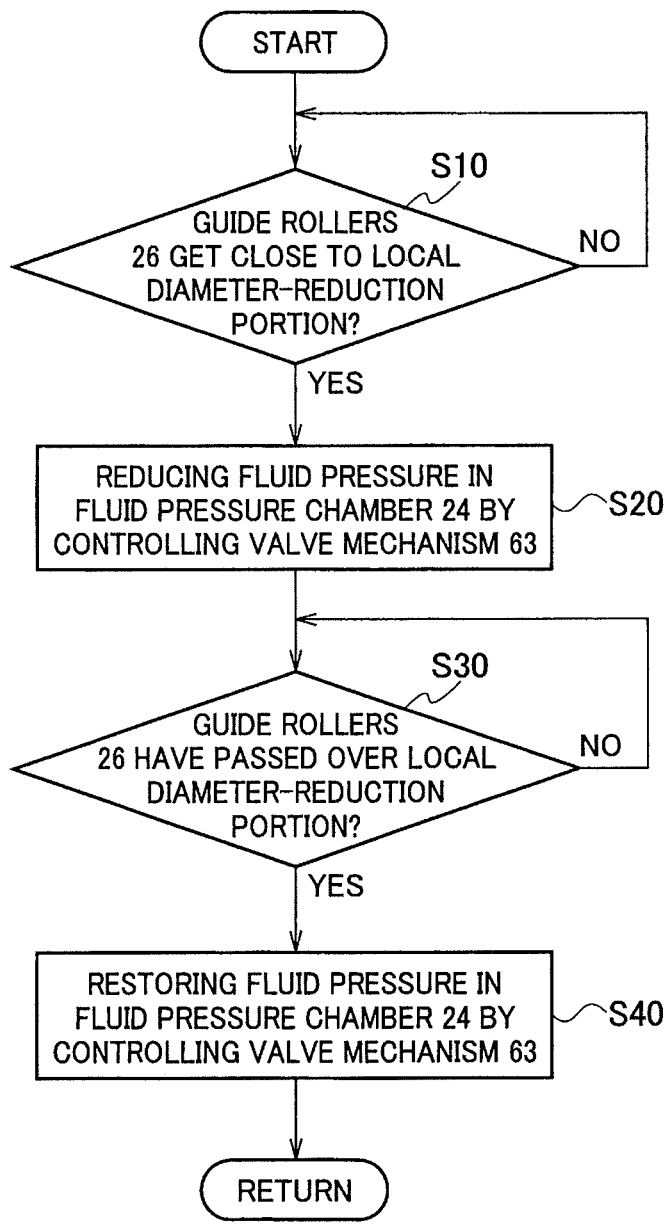
FIG. 12 is a flowchart of an oil pressure control while the working head passes over the circumferential protrusion (the circumferential groove) on the inner surface of the workpiece.

Subsequently, operations of the working head 20 for cutting, by the hole inner-surface cutting apparatus 1 having the above configuration, the inner surface of the penetrating hole 2h on which a circumferential protrusion 2r is formed will be explained with reference to a flowchart shown in FIG. 12 and FIG. 6 to FIG. 8. In FIG. 6 to FIG. 8, shown is a case where the guide rollers 26 of the first mechanism 22A pass over the circumferential protrusion 2r. The flowchart shown in FIG. 12 is executed with respect to each of the first mechanism 22A to the third mechanism 22C. Here, explanations will be made with the first mechanism 22A taken as an example as shown in FIG. 6 to FIG. 8.

Note that the working head 20 is travelled by being pulled leftward in the figures by the head stroke rod 31. Therefore, the guide rollers 26 of the first mechanism 22A pass over a local diameter-reduction portion X of the circumferential protrusion 2r to run on the circumferential protrusion 2r, and then pass over a local diameter-expansion portion Y of the circumferential protrusion 2r to run past the circumferential protrusion 2r.

As explained above, the initial position of the working head 20 is set after the hollow shaft 2 has been installed. In addition, shape data of the hollow shaft 2 are also preliminarily input to the controller 70. Therefore, it is preliminarily recognized how long the working head 20 strokes from its initial position until the guide rollers 26 of the first mechanism 22A reach the circumferential protrusion 2r. The controller 70 keeps monitoring whether or not the guide rollers 26 of the first mechanism 22A get close to the local diameter-reduction portion X of the circumferential protrusion 2r (step S10). For example, the step S10 is affirmed when the guide rollers 26 get to within a predetermined distance of the local diameter-reduction portion X. This predetermined distance may be set fixedly, or may be changed according to the stroke speed of the working head 20.

As shown in FIG. 6, when it is judged that the guide rollers 26 of the first mechanism 22A get close to the local diameter-reduction portion X of the circumferential protrusion 2r (YES in step S10), the valve mechanism (the pressure reduction valve) 63 associating with the first mechanism 22A is controlled by the controller 70 to reduce the fluid pressure in the fluid pressure chamber 24 of the first mechanism 22A (step S20). Namely, the fluid pressure in the fluid pressure chamber 24 of the first mechanism 22A is made lower than the fluid pressure in the fluid pressure chambers 24 of the second mechanism 22B and the third mechanism 22C. Since the fluid pressure in the fluid pressure chamber 24 of the first mechanism 22A is reduced, the sliders 25 are slid smoothly in a radially inner direction by being pushed by the local diameter-reduction portion X as shown in FIG. 7 even when the guide rollers 26 reach the local diameter-reduction portion X of the circumferential protrusion 2r due to stroking of the working head 20 and thereby stroking of the working head 20 never be interfered.

In addition, the first mechanism 22A doesn't contribute the positioning of the working head 20 while the fluid pressure in the fluid pressure chamber 24 of the first mechanism 22A is reduced. However, the center axis of the working head 20 is made coincident with the axis of the penetrating hole 2h by the remaining two, the second mechanism 22b and the third mechanism 22C, and thereby the position of the cutting tool 20c is controlled with high precision to maintain high precision cutting. After the step S20, the controller 70 keeps monitoring whether or not the guide rollers 26 of the first mechanism 22A have passed over the local diameter-reduction portion X of the circumferential protrusion 2r (step S30). For example, the step S30 is affirmed when the guide rollers 26 get distanced from the local diameter-reduction portion X by a predetermined distance. This predetermined distance may be set fixedly, or may be changed according to the stroke speed of the working head 20.

When it is judged that the guide rollers 26 of the first mechanism 22A have passed over the local diameter-reduction portion X of the circumferential protrusion 2r (YES in step S30), the valve mechanism (the pressure reduction valve) 63 associating with the first mechanism 22A is controlled by the controller 70 to increase and restore the fluid pressure in the fluid pressure chamber 24 of the first mechanism 22A (step S40). Namely, the fluid pressure in the fluid pressure chamber 24 of the first mechanism 22A is increased to the fluid pressure in the fluid pressure chambers 24 of the second mechanism 22B and the third mechanism 22C. Since the fluid pressure in the fluid pressure chamber 24 of the first mechanism 22A is restored, the sliders 25 are pushed radially outward and thereby the guide rollers 26 are pressed onto the inner surface of the penetrating hole 2h again as shown in FIG. 8. Therefore, the positioning of the working head 20 is done by all the three mechanisms 22A to 22C, and thereby the center axis of the working head 20 is made coincident with the axis of the penetrating hole 2h. Namely, the position of the cutting tool 20c is controlled with high precision, and thereby high precision cutting is maintained.

Note that, if a width of the circumferential protrusion 2r is larger than the above-explained predetermined distance for monitoring that the guide rollers 26 pass over the local diameter-reduction portion X, there may be a case where the fluid pressure 24 is restored while the guide rollers 26 contact with an inner circumferential surface of the circumferential protrusion 2r (see FIG. 7). In this case, the guide rollers 26 is moved radially outward by the restored fluid pressure in the fluid pressure chamber 24 after they reaches the local diameter-expansion portion Y and thereby they turn into a state shown in FIG. 8 similarly. Also in this case, stroking of the working head 20 never be interfered.

Figure 9:
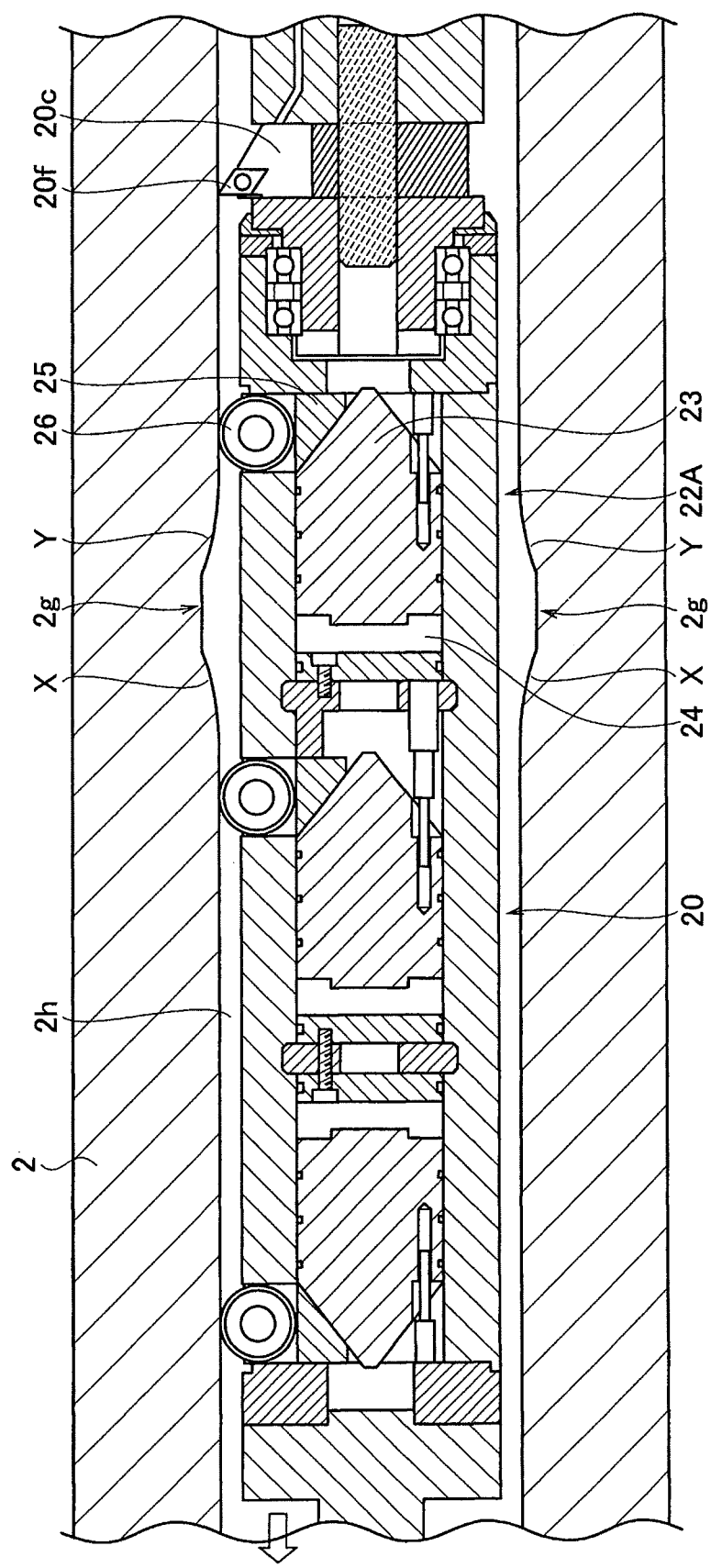
FIG. 9 is a cross-sectional view while the working head passes over a circumferential groove on the inner surface of the workpiece (before passing over)
Figure 10:
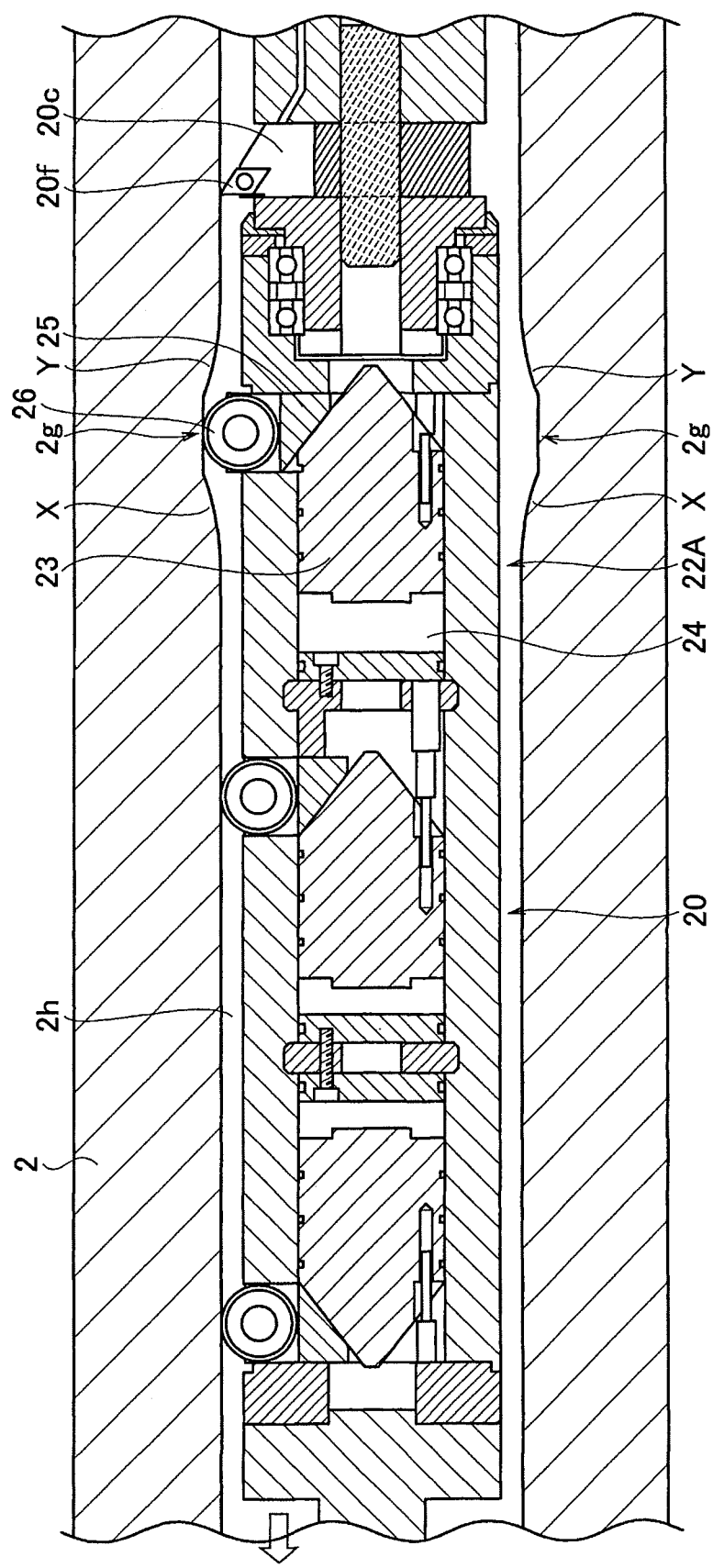
FIG. 10 is a cross-sectional view while the working head passes over the circumferential groove on the inner surface of the workpiece (during passing over)
Figure 11:
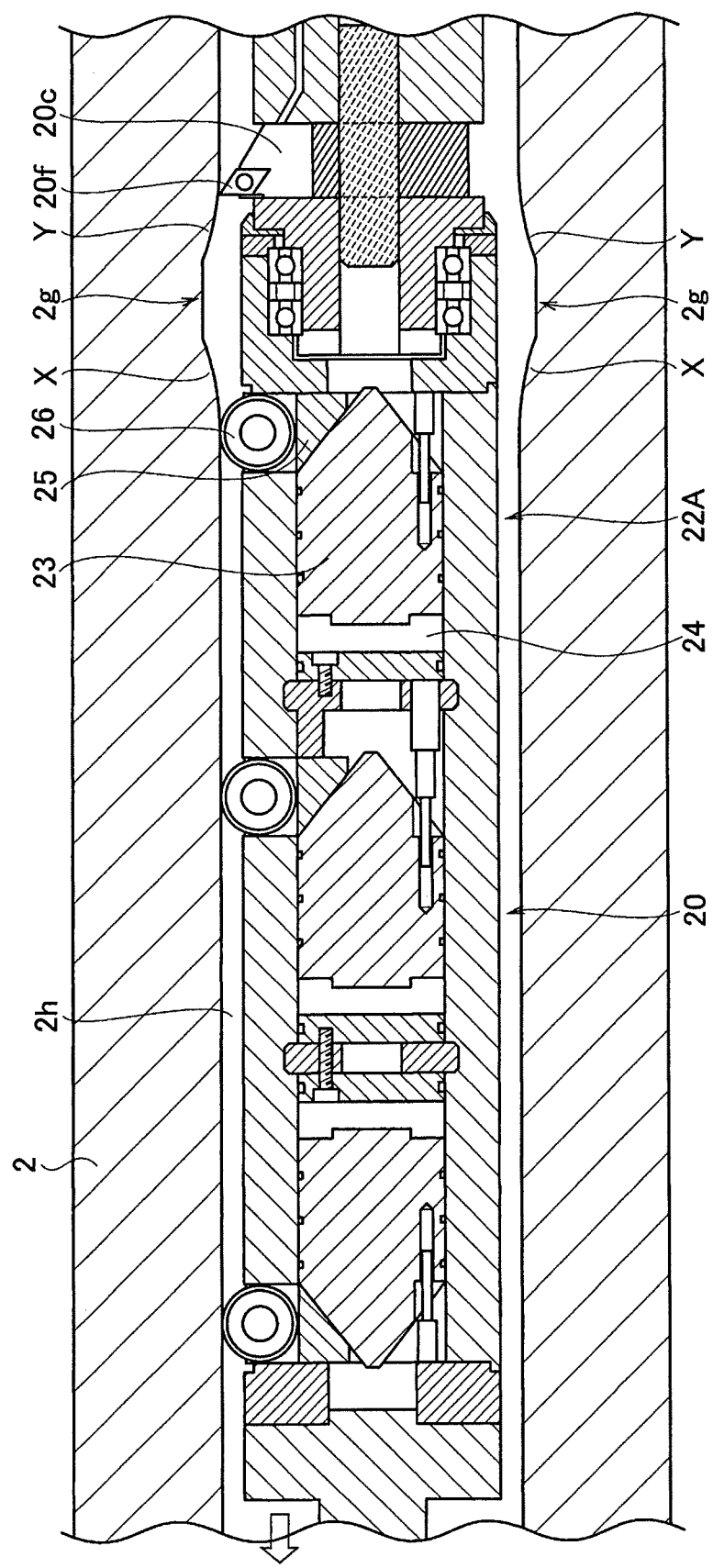
FIG. 11 is a cross-sectional view while the working head passes over the circumferential groove on the inner surface of the workpiece (after passing over)

Subsequently, operations of the working head 20 for cutting, by the hole inner-surface cutting apparatus 1, the inner surface of the penetrating hole 2h on which a circumferential groove 2g is formed will be explained with reference to the flowchart shown in FIG. 12 and FIG. 9 to FIG. 11. In FIG. 9 to FIG. 11, shown is a case where the guide rollers 26 of the first mechanism 22A pass over the circumferential groove 2g. The flowchart shown in FIG. 12 can be applied not only to the circumferential protrusion 2r but also to the circumferential groove 2g, and is executed with respect to each of the first mechanism 22A to the third mechanism 22C. Here, explanations will be made with the first mechanism 22A taken as an example as shown in FIG. 9 to FIG. 11. The guide rollers 26 of the first mechanism 22A pass over the local diameter-expansion portion Y of the circumferential groove 2g to enter into the circumferential groove 2g, and then pass over the local diameter-reduction portion X of the circumferential groove 2g to get across the circumferential groove 2g.

Similarly to the above-explained case of the circumferential protrusion 2r, the controller 70 keeps monitoring whether or not the guide rollers 26 of the first mechanism 22A get close to the local diameter-reduction portion X of the circumferential groove 2g (step S10). As explained above, the step S10 is affirmed when the guide rollers 26 get to within a predetermined distance of the local diameter-reduction portion X. Namely, the fluid pressure in the fluid pressure chamber 24 is not controlled with respect to the previous local diameter-expansion portion Y of the circumferential groove 2g. If the guide rollers 26 reach the local diameter-expansion portion Y before the fluid pressure control of the fluid pressure chamber 24 for the local diameter-reduction portion X is started, there may be a case where the sliders 25 are slid radially outward according to the fluid pressure in the fluid pressure chamber 24 and the guide rollers 26 are pressed onto a bottom surface of the circumferential groove 2g. Of course, there may be a case where the step S10 is affirmed before the guide rollers 26 reach the local diameter-expansion portion Y.

In the present embodiment, in a state where the guide rollers 26 of the first mechanism 22A get close to the local diameter-expansion portion Y of the circumferential groove 2g as shown in FIG. 9, it is not judged that they get close to the local diameter-reduction portion X (NO in step S10). However, it is judged that the guide rollers 26 get close to the local diameter-reduction portion X of the circumferential groove 2g when the guide rollers 26 have entered onto the circumferential groove 2g as shown in FIG. 10 (YES in step S10: the above-explained predetermined diameter is shorter than a width of the circumferential groove 2g). At this moment, the guide rollers 26 have been moved radially outward toward the bottom surface of the circumferential groove 2g as explained above.

When the step S10 is affirmed, the valve mechanism (the pressure reduction valve) 63 associating with the first mechanism 22A is controlled by the controller 70 to reduce the fluid pressure in the fluid pressure chamber 24 of the first mechanism 22A (step S20). Namely, the fluid pressure in the fluid pressure chamber 24 of the first mechanism 22A is made lower than the fluid pressure in the fluid pressure chambers 24 of the second mechanism 22B and the third mechanism 22C. Since the fluid pressure in the fluid pressure chamber 24 of the first mechanism 22A is reduced, the sliders 25 are slid smoothly in a radially inner direction by being pushed by the local diameter-reduction portion X as shown in FIG. 11 when the guide rollers 26 reach the local diameter-reduction portion X of the circumferential groove 2g due to further stroking of the working head 20 and thereby stroking of the working head 20 never be interfered.

The first mechanism 22A doesn't contribute the positioning of the working head 20 while the fluid pressure in the fluid pressure chamber 24 of the first mechanism 22A is reduced. However, the center axis of the working head 20 is made coincident with the axis of the penetrating hole 2h by the remaining two, the second mechanism 22B and the third mechanism 22C, and thereby the position of the cutting tool 20c is controlled with high precision to maintain high precision cutting. After the step S20, the controller 70 keeps monitoring whether or not the guide rollers 26 of the first mechanism 22A have passed over the local diameter-reduction portion X of the circumferential groove 2g (step S30). As explained above, the step S30 is affirmed when the guide rollers 26 get distanced from the local diameter-reduction portion X by a predetermined distance.

When it is judged that the guide rollers 26 of the first mechanism 22A have passed over the local diameter-reduction portion X of the circumferential groove 2g (YES in step S30), the valve mechanism (the pressure reduction valve) 63 associating with the first mechanism 22A is controlled by the controller 70 to increase and restore the fluid pressure in the fluid pressure chamber 24 of the first mechanism 22A (step S40). Namely, the fluid pressure in the fluid pressure chamber 24 of the first mechanism 22A is increased to the fluid pressure in the fluid pressure chambers 24 of the second mechanism 22B and the third mechanism 22C. Since the fluid pressure in the fluid pressure chamber 24 of the first mechanism 22A is restored, the guide rollers 26 are pressed onto the inner surface of the penetrating hole 2h again as shown in FIG. 11. Therefore, the positioning of the working head 20 is done by all the three mechanisms 22A to 22C, and thereby the center axis of the working head 20 is made coincident with the axis of the penetrating hole 2h. Namely, the position of the cutting tool 20c is controlled with high precision, and thereby high precision cutting is maintained.

According to the hole inner-surface cutting apparatus 1 in the present embodiment, the working head 20 includes the (at least) three positioning mechanisms 22 (22A to 22C) along its center axis. And, the fluid pressures in the fluid pressure chambers 24 of the three positioning mechanisms 22 can be controlled by the controller 70 independently from each other. Therefore, even while any one of the three positioning mechanism 22 passes over the circumferential protrusion 2r or the circumferential groove 2g (i.e. the local diameter-reduction portion X) formed in the penetrating hole 2h, the center axis of the working head 20 is made coincident with the axis of the penetrating hole 2h by the at least two positioning mechanisms 22. Thus, the position of the cutting tool 20c can be maintained with high precision, and thereby high precision cutting can be done.

Especially, according to the hole inner-surface cutting method in the present embodiment, the fluid pressure in the fluid pressure chamber 24 of the positioning mechanism 22 that passes over the circumferential protrusion 2r or the circumferential groove 2g (i.e. the local diameter-reduction portion X) is made lower than the fluid pressure in the pressure chambers 24 of the other positioning mechanisms 22 by the controller 70. Therefore, stroking of the working head 20 is never interfered by the local diameter-reduction portion X, and thereby the position of the cutting tool 20c can be controlled with high precision to maintain high precision cutting.

In the present embodiment, the fluid pressure to be supplied to the pressure chambers 24 of the positioning mechanisms 22 is generated by the single fluid pressure source (the oil tank 61 and the oil pump 62), and then supplied to the pressure chambers 24 through the fluid pressure passages 31a independent from each other. And, the valve mechanisms 63 for adjusting the fluid pressures are provided on the fluid pressure passages 31a, respectively. Therefore, a uniform pressure can be regularly supplied to the plural fluid pressure chambers 24 from the single fluid pressure source. Then, while any one of the positioning mechanisms 22 passes over the circumferential protrusion 2r or the circumferential groove 2g (i.e. the local diameter-reduction portion X), only the fluid pressure in the fluid pressure chamber 24 of the said positioning mechanism 22 can be adjusted by the valve mechanism 63. Thus, the supply system of the fluid pressure(s) can be configured simply, and the fluid pressure control can be done reliably.

In addition, in the present embodiment, the sliders 25 of the first mechanism 22A, the fluid pressure chamber 24 of the first mechanism 22A, the sliders 25 of the second mechanism 22B, the fluid pressure chamber 24 of the second mechanism 22B, the fluid pressure chamber 24 of the third mechanism 22C, and the sliders 25 of the third mechanism 22C are disposed in this order from the cutting tool 20c along the center axis of the working head 20. Since the sliders 25, i.e. the guide rollers 26, of the first mechanism 22A are disposed closest to the cutting tool 20c, the position of the cutting tool 20c can be kept with high precision and thereby high precision cutting can be done. Here, while the guide rollers 26 of the first mechanism 22A pass over the circumferential protrusion 2r or the circumferential groove 2g (i.e. the local diameter-reduction portion X), the first mechanism 22A doesn't contribute the positioning of the working head 20. However, since the sliders 25, i.e. the guide rollers 26, of the second mechanism 22B is disposed as close as possible to the cutting tool 20c, the position of the working head 20 can be kept with high precision and high precision cutting can be done. Here, the sliders 25 (the guide rollers 26) of the third mechanism 22C are disposed as far as possible from the sliders 25 (the guide rollers 26) of the second mechanism 22B. Therefore, the axis of the working head 20 in the penetrating hole 2h can be effectively restricted from inclining by the second mechanism 22B and the third mechanism 22C, and thereby the high precision cutting can be done.

Further, in the present embodiment, the fluid supply passages 31a are provided in the head stroke rod 31 and the head main body 20a, and the coolant supply passage 41a is provided in the head rotation rod 41 and the head rotatable body 20b. By separating the both passages in this manner, the fluid pressure(s) and the coolant can be supplied to the working head 20 reliably. In addition, the passages can be formed simply in the working head 20 by separating the both passages, and thereby the working head 20 can be downsized. As the result, it becomes possible to deal with a penetrating hole whose diameter is smaller. In addition, since the coolant is supplied to the head rotatable body 20b, i.e. to the vicinity of the cutting tool 20c, cutting can be done stably.

Furthermore, in the present embodiment, the stroke position of the working head 20 is detected by the controller 70 based on the number of rotations of the feed motor 32d (the control information of the stroke drive source). Therefore, it is needless to provide a sensor for detecting the stroke position, and thereby high precision cutting can be done with simple configuration. Since approach of any of the positioning mechanisms 22 (any set of the guide rollers 26) to the circumferential protrusion 2r or the circumferential grooves 2g (i.e. the local diameter-reduction portion X) is also detected by this stroke position, it contributes the high precision cutting in view of this point.

Similarly, the cutting diameter (the position in the radial direction) of the cutting tool 20c is detected by the controller 70 based of the control state of the actuator 42e (the control information of the cutting tool shift mechanism). Therefore, it is needless to provide a sensor for detecting the cutting diameter, and thereby high precision cutting can be done with simple configuration.

In addition, in the present embodiment, since any of the positioning mechanisms 22 (any set of the guide rollers 26) passes over the circumferential protrusion 2r or the circumferential groove 2g (i.e. the local diameter-reduction portion X) and then the fluid pressure of the fluid pressure chamber 24 associated therewith is restored, high precision cutting can be done stably while not being affected from the circumferential protrusion 2r or the circumferential grooves 2g (i.e. the local diameter-reduction portion X).

The hole inner-surface cutting apparatus and method according to the disclosure can be utilized as an apparatus and a method for cutting an inner surface of a penetrating hole formed in a workpiece.

What is claimed is:

1. A hole inner-surface cutting apparatus for cutting an inner surface of a penetrating hole formed in a workpiece, the apparatus comprising:
   a workpiece hold device that holds the workpiece;
   a working head capable of being inserted into the penetrating hole, and including a head rotatable body that has a cutting tool for cutting the inner surface of the penetrating hole and is rotatable about a center axis thereof and a head main body that rotatably holds the head rotatable body;
   a head rotation rod capable of being inserted into the penetrating hole from an end of the penetrating hole, and coupled with the head rotatable body to rotate the head rotatable body by being rotated by a rotation drive source; and
   a head stroke rod capable of being inserted into the penetrating hole from another end of the penetrating hole, and coupled with the head main body to stroke the working head in an axial direction of the penetrating hole by being stroked by a stroke drive source, wherein
   a cutting tool shift mechanism for shifting the cutting tool in a radial direction perpendicular to the axial direction is provided in the head rotatable body of the working head and the head rotation rod,
   a plurality of positioning mechanisms for positioning the working head along the radial direction in the penetrating hole is provided at at least three positions along the axial direction in the head main body,
   each of the positioning mechanisms has at least three sliders radially arranged evenly and slidable in the radial direction, guide rollers respectively disposed on distal ends of the sliders and contacting with the inner surface of the penetrating hole, a piston for pressing the sliders outward in the radial direction, and a fluid pressure chamber for actuating the piston, and
   the hole inner-surface cutting apparatus further comprises a controller configured to control fluid pressures in the fluid pressure chambers of the positioning mechanisms independently from each other.

2. The hole inner-surface cutting apparatus according to claim 1, further comprising:
   a fluid pressure source for supplying fluid pressure to the fluid pressure chambers;
   fluid pressure passages connecting the fluid pressure source with the fluid pressure chambers, respectively; and
   valve mechanisms provided on the fluid pressure passages to adjust the fluid pressures to be supplied to the pressure chambers, respectively, by being controlled by the controller.

3. The hole inner-surface cutting apparatus according to claim 2, wherein
   the head stroke rod and the head main body include the fluid pressure passages, and
   the head rotation rod and the head rotatable body include a supply passage for supplying cutting fluid to a vicinity of the cutting tool.

4. The hole inner-surface cutting apparatus according to claim 1, wherein
   the stroke drive source is controlled by the controller, and the controller detects a position of the working head in the axial direction in the penetrating hole based on control information of the stroke drive source.

5. The hole inner-surface cutting apparatus according to claim 1, wherein the cutting tool shift mechanism is controlled by the controller, and the controller detects a position of the cutting tool in the radial direction in the penetrating hole based on control information of the cutting tool shift mechanism.

\* \* \* \* \*